UNITED STATES PATENT OFFICE.

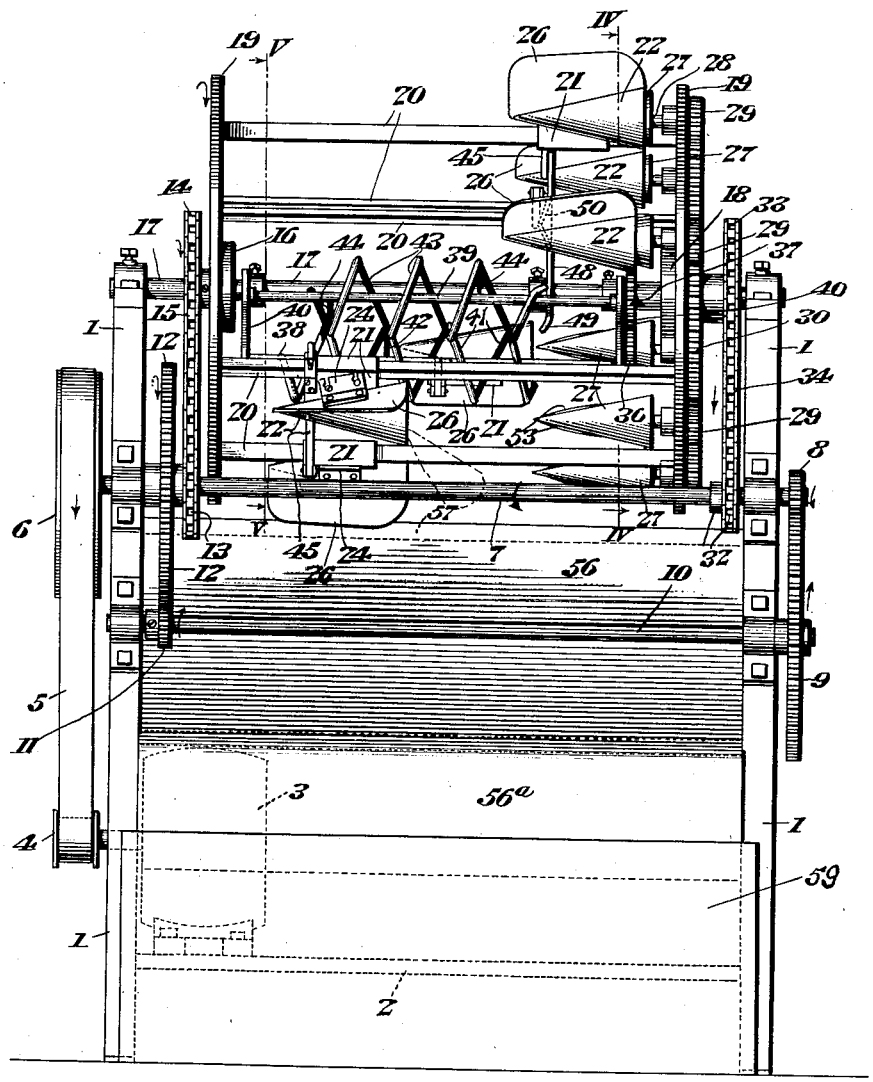

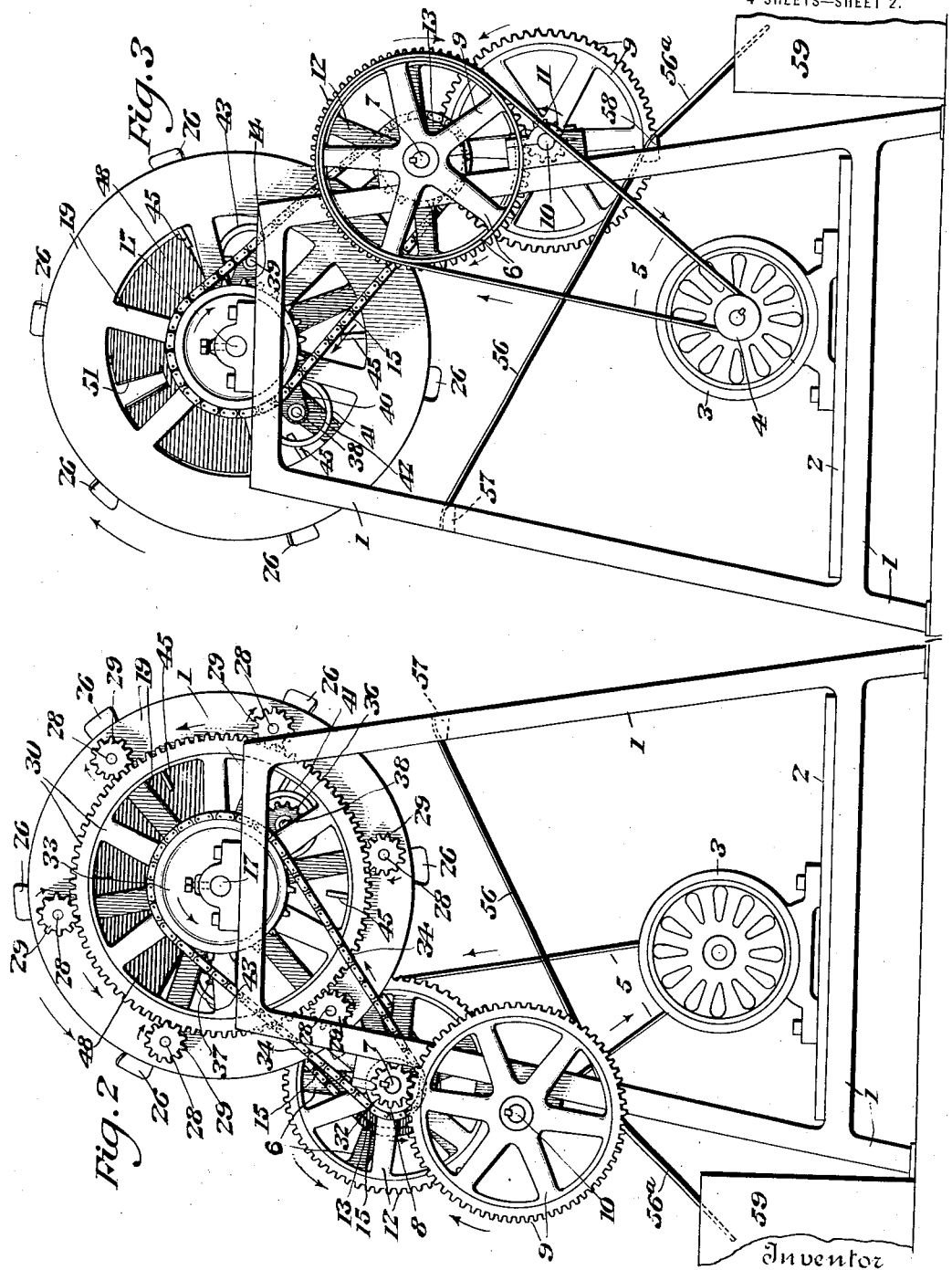

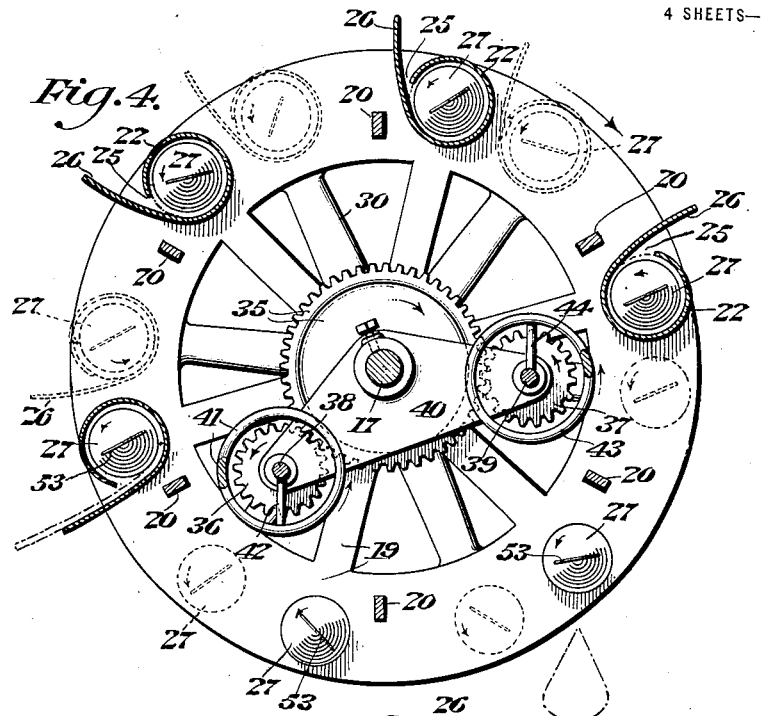
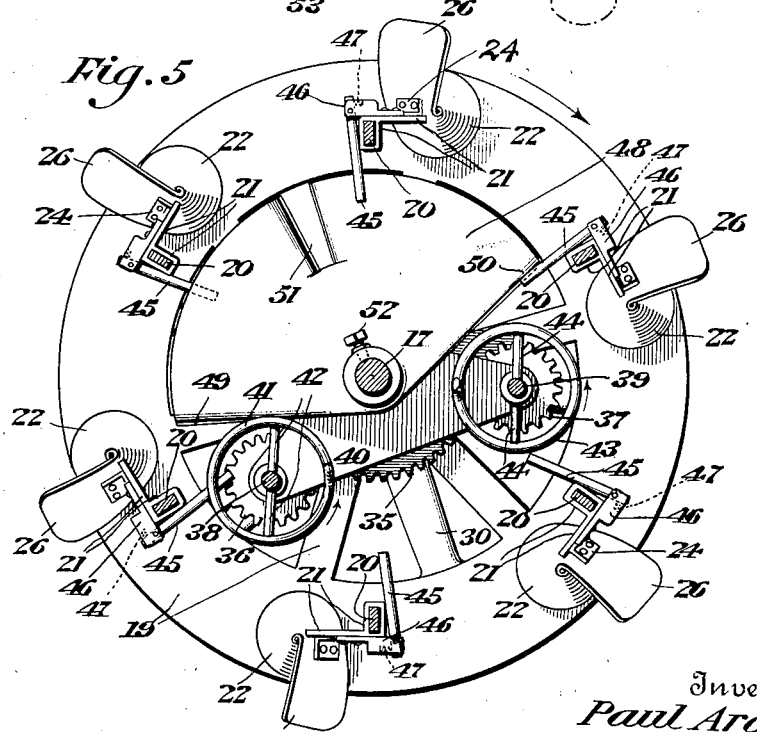

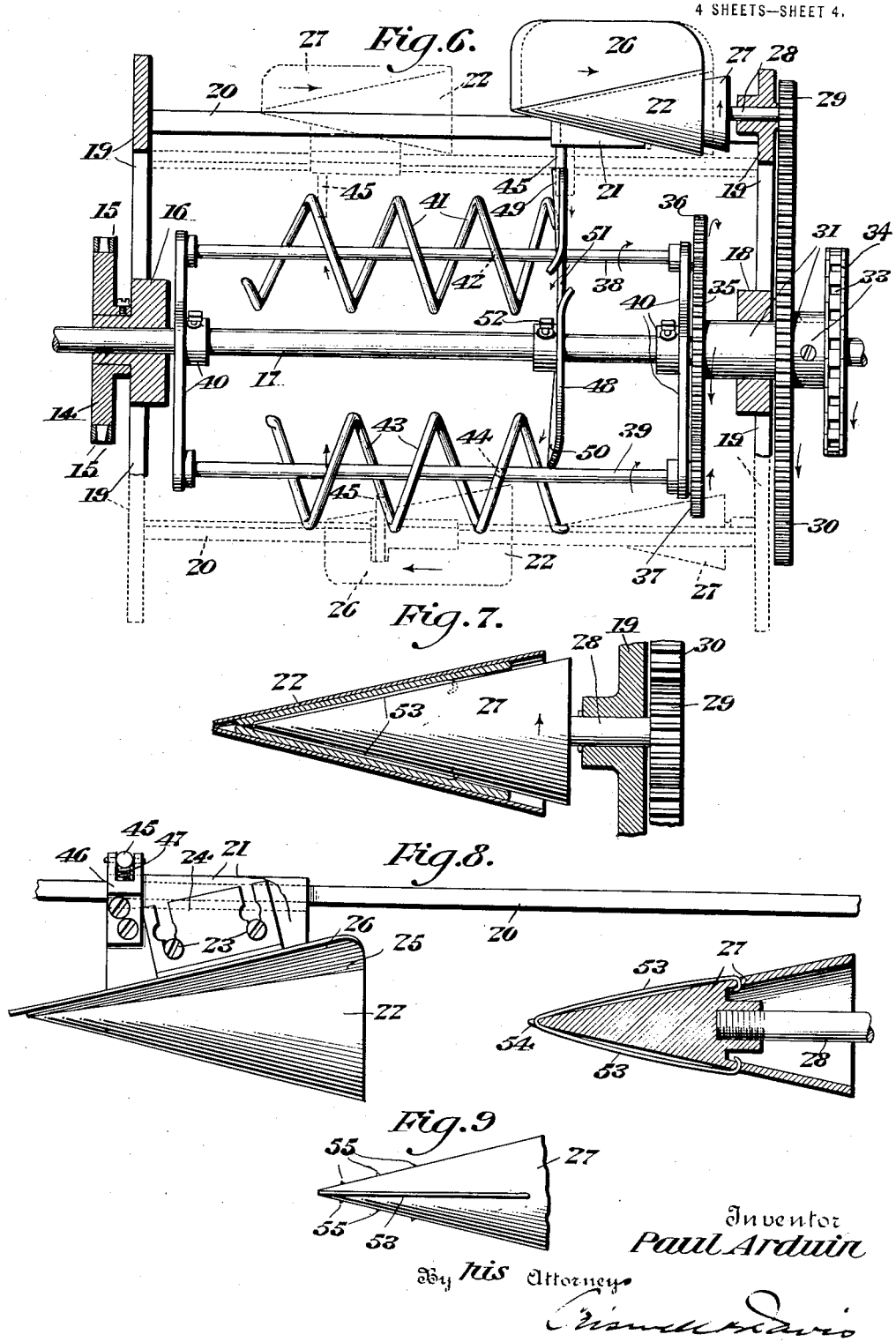

PAUL ARDUIN, OF MOUNT VERNON, NEW YORK, ASSIGNOR TO ARDUIN BROTHERS, OF MOUNT VERNON, NEW YORK, A COPARTNERSHIP COMPOSED OF ROBERT ARDUIN AND CAESAR ARDUIN.

MACHINE FOR MAKING PASTRY CONES.

1,332,590.  Specification of Letters Patent.  Patented Mar. 2, 1920.

Application filed June 20, 1919. Serial No. 305,557.

*To all whom it may concern:*

Be it known that I, PAUL ARDUIN, a citizen of the United States, and resident of Mount Vernon, in the county of Westchester and State of New York, have invented certain new and useful Improvements in Machines for Making Pastry Cones, of which the following is a specification.

This invention relates to improvements in machines for forming hollow, cone-shaped containers, and is especially adapted for use in forming previously cooked edible wafers into cone-shaped containers for ice cream.

The invention has for one object the provision of simple mechanism for rapidly shaping an edible wafer while heated, into permanent cone form.

Another object of the invention is to provide a machine having means for successively presenting a plurality of automatically operating cone-forming devices in position to receive a wafer, and means for automatically delivering the shaped cones into a receptacle.

In the drawings, Figure 1 is a rear elevation of the machine;

Figs. 2 and 3 side elevations of the left and right-hand sides of the machine, respectively;

Fig. 4 a fragmentary transverse section on the line IV—IV of Fig. 1;

Fig. 5 a fragmentary transverse section on the line V—V of Fig. 1;

Fig. 6 a fragmentary horizontal sectional view showing the mechanism for shifting the parts of the shaping devices into and out of engagement;

Figs. 7 and 8 detail views of one of the shaping devices; and

Fig. 9 a detail view showing a slightly modified construction of mandrel.

Referring to the various parts by numerals, 1 designates the frame of the machine on which is supported a platform 2. An electric motor 3 is mounted on the platform 2 and a pulley 4 is fixed on the drive shaft of said motor. The motor may be connected with any suitable source of current and any suitable form of switch may be provided for starting and stopping the motor. A belt 5 passes over the pulley 4 and over a pulley 6 fixed on the right-hand end of a shaft 7 journaled in suitable bearings on the frame 1. A small pinion 8, fixed on the left-hand end of shaft 7, meshes with a large pinion 9 fixed on the left-hand end of a shaft 10 journaled in suitable bearings in the frame 1 below shaft 7. A small pinion 11 fixed on shaft 10 adjacent the right-hand side of the machine, meshes with a large gear 12 loosely mounted on shaft 7. A sprocket wheel 13 is fixed on the hub of gear 12 and drives a sprocket wheel 14 through the medium of a sprocket chain 15.

The sprocket wheel 14 is fixed on the right-hand hub 16 of an endless carrier or rotary frame which is rotatable about a stationary shaft or rod 17 rigidly held in the upper end of the frame 1. The endless revolving carrier has a left-hand hub 18 loosely journaled on shaft 17, and a pair of circular end members 19 rigidly held to the hubs 16 and 18 and connected by six radially spaced bars 20 which are rectangular in cross section. A slide 21 is mounted on each of the bars 20 of the carrier to move longitudinally thereof, each of said slides being formed with an angular aperture through which the bar extends, whereby the slides are held against rotation about the bars. Forming dies or members 22 of hollow conical shape are detachably held to the slides 21 by means of locking screws 23 which pass through slots in brackets 24 held to the dies. Each die is formed with a longitudinally extending slot or throat 25 at the outer side thereof, and with a flattened extension or lip 26 along one edge of said slot or throat.

Each die 22 is adapted to be shifted into and out of engagement with one of a series of six radially spaced mandrels, 27 once during each revolution of the revolving carrier. The mandrels 27 are cone-shaped and are threaded on the inner ends of shafts 28 journaled in suitable bearings in the left-hand end member 19 of the carrier. The mandrels 27 are rotated in a direction opposite to the direction of rotation of the carrier and at a considerably greater speed, by means of small pinions 29 fixed on the outer ends of the shafts 28. The pinions 29 mesh with a large gear wheel 30 which is fixed on a sleeve 31 loosely mounted on the stationary shaft 17. The sleeve 31 and gear 30 are rotated in the same direction as the carrier, but at a considerably higher speed, through sprocket wheels 32 and 33 fixed, respectively, on shaft 7 and sleeve 31 and connected by a sprocket chain 34.

A gear 35 fixed on the inner end of sleeve 31 meshes with two pinions 36 and 37 fixed on shafts 38 and 39 journaled in the opposite ends of brackets 40 rigidly held to the stationary shaft 17 and extending forwardly and rearwardly of the shaft. A worm 41 is held to the shaft 38 by posts 42, and a worm 43 is held to shaft 39 by posts 44, said worms being formed by helical rods coiled about the shafts in reverse directions and adapted to be successively engaged by pins or fingers 45 which extend radially inward from the die-shifting slides 21. The fingers 45 are pivotally held in yokes 46 carried by the slides 21 and are normally forced in one direction into engagement with the slides, by coiled springs 47, whereby said pins may yield slightly when they engage the slide-operating devices as hereinafter described. A segmental cam plate 48 is rigidly held to the stationary shaft 17. Cam plate 48 is provided at one end with a laterally bent cam portion 49 overhanging worm 41 adjacent the left-hand end of the worm, and is provided at its opposite end with a laterally bent cam portion 50 over-hanging the left-hand end of worm 43. Midway its ends the cam plate 48 is slotted radially inwardly and the metal at opposite sides of the slot is bent laterally in opposite directions to form a diagonal transfer cam slot 51 adapted to direct the slide-shifting pins from the left-hand side of the cam plate to the right-hand side thereof. The cam plate is adjustable longitudinally of the shaft 17 to determine the limit of movement of the dies toward the left-hand side of the machine to compensate for various thicknesses of wafers and to adapt the machine for use with different sizes of dies and mandrels, the plate being locked in its adjusted position by a suitable set screw 52.

Each mandrel 27 is provided at opposite sides thereof with normally outwardly bowed springs 53 extending longitudinally of the mandrel and preferably formed of a single length of resilient wire passing through a notch or slot 54 at the apex of the mandrel and having its ends secured to the mandrel at oppositely disposed points, as shown more clearly in Fig. 8. The springs 53 serve to assist the friction of the mandrels in drawing wafers through the throats of the dies, and also coöperate with the dies to strip the shaped wafers from the mandrels when the dies are withdrawn from the mandrels, as hereinafter more fully described. If desired, the mandrels may be provided with a plurality of small projections 55, as shown in the modification illustrated in Fig. 9, adapted to grip a blank or wafer as it is fed through the throat of the die.

In the operation of the machine, the circuit through motor 3 is closed and the parts are driven continuously in the directions indicated by the arrows in the several views. As each slide passes worm 41 during the rotation of the die carrier, its finger 45 engages the worm and the slide and die are shifted longitudinally of their supporting bar 20 by the worm, toward the left-hand side of the machine to the position shown in full lines in Fig. 6. When the die reaches this position, partially embracing its associated mandrel, the operator places a wafer upon the extension or lip 26 of the die and passes one edge of the wafer through the throat 25 of the die, whereupon the wafer is drawn into the die by the rapidly rotating mandrel and wound about the mandrel. As the pin 45 leaves the worm 41 it engages the left-hand side of the cam portion 49 of plate 48 which imparts an additional movement toward the left to the die to force the die into closer engagement with the mandrel and thus press the convolutions of the wafer wound upon the revolving mandrel firmly together, causing the several convolutions of the freshly cooked hot wafer to adhere and become partially merged with each other. When the die and mandrel have been carried beyond the feed point through substantially a quarter-revolution of the carrier, the pin 45 engages in the cam slot 51 and is shifted from the left to the right of the cam plate, thus withdrawing the die from the mandrel sufficiently to relieve the pressure on the shaped wafer. As the die and mandrel approach a point opposite the feed point the finger 45 rides over the cam portion 50 of plate 48 and causes a further, relatively slow, partial withdrawal of the die from the mandrel sufficiently to permit the springs 53 to fully expand and loosen the shaped wafer on the mandrel and press the same against the inner surface of the die. Immediately after passing from the cam surface 50 the pin 45 engages worm 43 and the die is rapidly withdrawn from the mandrel to a point adjacent the right-hand side of the machine, the shaped wafer being withdrawn from the mandrel with the die and dropping out of the die upon an apron 56. The apron 56 extends below the die carrier and is held in a rearwardly and downwardly inclined position upon transverse bars 57 and 58 held to the frame 1 of the machine. A rigid flap or extension 56ª is flexibly connected with the lower edge of the apron 56 adjacent the bar 58 and is adapted to have its free end inserted in the upper end of a suitable receptacle 59 to direct the shaped wafers or conical containers from the inclined apron into the receptacle.

What I claim is:

1. In a machine for making conical containers, the combination of a conical mandrel, a hollow conical die, means for rotating the mandrel relatively to the die, and means for moving the die into and out of coöperative relation with the mandrel.

2. In a machine for making conical containers, the combination of a conical mandrel, means for rotating the mandrel, a hollow conical die having a throat extending longitudinally thereof through which a blank may be fed into the die, and means for shifting the die longitudinally into and out of engagement with the mandrel.

3. In a machine for making conical containers, the combination of a conical mandrel, a hollow conical die having a throat extending longitudinally thereof, means for imparting a relative rotary movement between the mandrel and die, and means for imparting a relative longitudinal movement between the mandrel and die to engage and disengage the same.

4. In a machine for forming containers, the combination of an endless carrier, means for driving the carrier, a plurality of coöperating dies and mandrels supported on the carrier to travel therewith, means for rotating the mandrels about their axes, and means for shifting each die into and out of engagement with its coöperating mandrel once during each circuit of the carrier.

5. In a machine for forming conical containers, the combination of an endless carrier, means for driving the carrier, a plurality of coöperating conical dies and mandrels supported on the carrier to travel therewith, means for rotating the mandrels about their axes, means for successively moving the dies into engagement with the mandrels at one point in the circuit of the carrier, and means for successively disengaging the dies from the mandrels at another point in the circuit of the carrier.

6. In a machine for forming conical containers, the combination of an endless carrier, means for driving the carrier, a plurality of coöperating conical dies and mandrels supported on the carrier to travel therewith, means for rotating the mandrels about their axes, means for successively moving the dies into engagement with the mandrels at one point in the circuit of the carrier, means for successively disengaging the dies from the mandrels at another point in the circuit of the carrier, and means for imparting an additional movement of the dies toward their associated mandrels to increase the pressure on blanks being shaped thereby during the engagement of the dies with the mandrels.

7. In a machine for forming conical containers, the combination of an endless carrier, means for driving the carrier, a plurality of coöperating conical dies and mandrels supported on the carrier to travel therewith, means for rotating the mandrels about their axes, means for successively moving the dies into engagement with the mandrels at one point in the circuit of the carrier, means for successively disengaging the dies from the mandrels at another point in the circuit of the carrier, and means for varying the relation between the dies and mandrels while in engagement with each other to first increase and then decrease the pressure on blanks being shaped thereby.

8. In a machine for forming conical containers, the combination of a rotary carrier, a plurality of radially spaced hollow conical dies slidably held to the carrier to move parallel with the axis of rotation thereof, a plurality of radially spaced conical mandrels held to the carrier in the path of the dies, means for rotating the mandrels about their axes, a stationary support, worms rotatably journaled in said support adapted to move the dies in opposite directions, and means held to the dies adapted to successively engage said worms.

9. In a machine of the class set forth, the combination of a rotary carrier, means for rotating the carrier, a plurality of hollow conical dies having blank-feeding slots therein and slidably held to the carrier, a plurality of conical mandrels held to the carrier in the path of the slidable dies, means for rotating the mandrels about their axes, a stationary support, worms journaled in said support adapted to shift the dies in opposite directions into and out of engagement with the mandrels, driving fingers held to the dies adapted to successively engage said worms during rotation of the carrier, and means for rotating the worms.

10. In a machine of the class set forth, the combination of a rotary carrier, means for rotating the carrier, a plurality of hollow conical dies having blank-feeding slots therein and slidably held to the carrier, a plurality of conical mandrels held to the carrier in the path of the slidable dies, means for rotating the mandrels about their axes, a stationary support, worms journaled in said support adapted to shift the dies in opposite directions into and out of engagement with the mandrels, driving fingers held to the dies adapted to successively engage said worms during rotation of the carrier, means for rotating the worms, and cam means located in the path of said driving fingers intermediate said worms for moving the dies into closer relation with the mandrels.

11. In a machine of the class set forth, the combination of a rotary carrier, means for rotating the carrier, a plurality of hollow conical dies having blank-feeding slots therein and slidably held to the carrier, a plurality of conical mandrels held to the carrier in the path of the slidable dies, means for rotating the mandrels about their axes, a stationary support, worms journaled in said support adapted to shift the dies in opposite directions into and out of engagement with the mandrels, driving fingers held to the dies adapted to successively engage said worms during rotation of the carrier, means for rotating the worms, and means located in the path of the driving fingers intermediate said worms for maintaining the dies in engagement with the mandrels.

12. In a machine of the class set forth, the combination of a rotary carrier, means for rotating the carrier, a plurality of hollow conical dies having blank-feeding slots therein and slidably held to the carrier, a plurality of conical mandrels held to the carrier in the path of the slidable dies, means for rotating the mandrels about their axes, a stationary support, worms journaled in said support adapted to shift the dies in opposite directions into and out of engagement with the mandrels, driving fingers held to the dies adapted to successively engage said worms during rotation of the carrier, means for rotating the worms, and means located in the path of the driving fingers intermediate said worms for maintaining the dies in engagement with the mandrels and for varying the pressure thereof upon blanks being shaped thereby.

13. In a machine of the class set forth, the combination of a rotary carrier, means for rotating the carrier, a plurality of hollow conical dies having blank-feeding slots therein and slidably held to the carrier, a plurality of conical mandrels held to the carrier in the path of the slidable dies, means for rotating the mandrels about their axes, a stationary support, worms journaled in said support adapted to shift the dies in opposite directions into and out of engagement with the mandrels, driving fingers held to the dies adapted to successively engage said worms during rotation of the carrier, means for rotating the worms, and normally outwardly bowed springs held to the mandrels and extending longitudinally thereof.

14. In a machine of the class set forth, the combination of a rotary carrier, means for rotating the carrier, a plurality of hollow conical dies having blank-feeding slots therein and slidably held to the carrier, a plurality of conical mandrels held to the carrier in the path of the slidable dies, means for rotating the mandrels about their axes, a stationary support, worms journaled in said support adapted to shift the dies in opposite directions into and out of engagement with the mandrels, driving fingers held to the dies adapted to successively engage said worms during rotation of the carrier, means for rotating the worms, and yieldable means carried by the mandrels adapted to coöperate with the dies to strip shaped blanks from the mandrels when the dies are moved out of engagement with the mandrels.

15. In a machine for making conical containers, the combination of a conical mandrel, a hollow conical die having a throat extending longitudinally thereof, means for imparting a relative rotary movement betwen the mandrel and die, means for imparting a relative longitudinal movement between the mandrel and die to engage and disengage the same, and yieldable means carried by the mandrel adapted to coöperate with the die to strip a shaped container from the mandrel during disengagement of the mandrel and die.

16. In a machine for making conical containers, the combination of a conical mandrel, means for rotating the mandrel, a hollow conical die having a throat extending longitudinally thereof through which a blank may be fed into the die, means for shifting the die longitudinally into and out of engagement with the mandrel, and a pair of oppositely disposed normally outwardly bowed springs held to the mandrel adapted to coöperate with the die to strip a shaped container from the mandrel during withdrawal of the die from engagement with the mandrel.

17. In a machine of the class set forth, the combination of a conical mandrel, means for rotating the mandrel, a hollow conical die having a throat at one side thereof and a flange projecting outwardly from one edge of the throat, and means for shifting the die into and out of engagement with the mandrel.

18. In a machine of the class set forth, the combination of a rotary carrier having a plurality of radially spaced bars extending longitudinally thereof, slides mounted on said bars to move longitudinally thereof, hollow conical dies mounted on the slides having their open ends facing one end of the carrier and each provided with a slot extending along one side thereof, fingers held to the slides, a pair of worms extending parallel with the axis of rotation of the carrier adapted to be engaged by said fingers at different points in the rotation of the carrier to move the slides in opposite directions, means for rotating the worms, a plurality of conical mandrels journaled at one end of the rotary carrier in the path of the dies, and means for rotating the mandrels about their axes.

This specification signed this fourteenth day of June, A. D. 1919.

PAUL ARDUIN.